Oct. 24, 1961 SHIH CHIEH CHAO 3,005,588
EMITTER TYPE ADDER
Filed Feb. 14, 1955 9 Sheets-Sheet 1

INVENTOR.
SHIH CHIEH CHAO
BY:
John B. Sponsler
AGENT

Oct. 24, 1961  SHIH CHIEH CHAO  3,005,588
EMITTER TYPE ADDER
Filed Feb. 14, 1955  9 Sheets-Sheet 4

Oct. 24, 1961 SHIH CHIEH CHAO 3,005,588
EMITTER TYPE ADDER

Filed Feb. 14, 1955 9 Sheets-Sheet 8

United States Patent Office 3,005,588
Patented Oct. 24, 1961

3,005,588
EMITTER TYPE ADDER
Shih Chieh Chao, San Jose, Calif., assignor to International Business Machines Corporation, New York, N.Y., a corporation of New York
Filed Feb. 14, 1955, Ser. No. 487,913
7 Claims. (Cl. 235—176)

The present invention appertains generally to adders and relates more particularly to emitter-type adders.

The invention comprises an electronic adder wherein numbers to be totaled are converted to a quantity of electrical impulses corresponding to the sum of the numbers. More specifically, the adder comprises a pulse generator arranged to enter pulses into emitter circuits which are under the control of the numbers being added to permit the passage of a number of such pulses corresponding to the sum of the numbers.

One object of the present invention is to provide an improved adder.

Another object is to provide an electronic adder wherein pulses entered therein are selectively emitted therefrom under the control of numbers being added.

Still another object is to provide an adder having emitters under the control of numbers to be added together and driven by a common pulse source to emit through a common line a selected number of pulses corresponding to the sum of the numbers.

The adder of the invention is arranged to add binary coded numbers serially by digit and parallelly by bit, and this feature of the invention permits the usage of a lesser number of tubes than are used normally. It is a further object of this invention, therefore, to provide a simplified and more economical binary adder.

A still further object is to provide an improved binary adder wherein the addition is serial by digit and parallel by bit.

Another object is to provide a binary adder having a decimal output wherein the conversion from binary to decimal is inherent in the operation of the adder.

A further object is to provide an adder having a plurality of emitters controlled to emit selected quantities of pulses into a single output circuit.

Still another object is to provide an adder of the type described wherein pulses emitted from various emitters to a common output circuit are separately interspersed in time in such a manner that no two of such pulses occur at the same time.

A still further object is to provide an emitter-type adder wherein emitters driven by a common pulse generator are controlled by numbers to be added together to emit a number of pulses to a common output circuit equal to the sum of the numbers.

Other objects of the invention will be pointed out in the following description and claims and illustrated in the accompanying drawings which disclose, by way of example, the principle of the invention and the best mode which has been contemplated of applying that principle.

FIGS 2a to 2f inclusive comprise a schematic diagram of the adder of the invention.

FIGS. 3 through 9 are schematic diagrams of various electronic components utilized in the novel adder.

Figure 10:
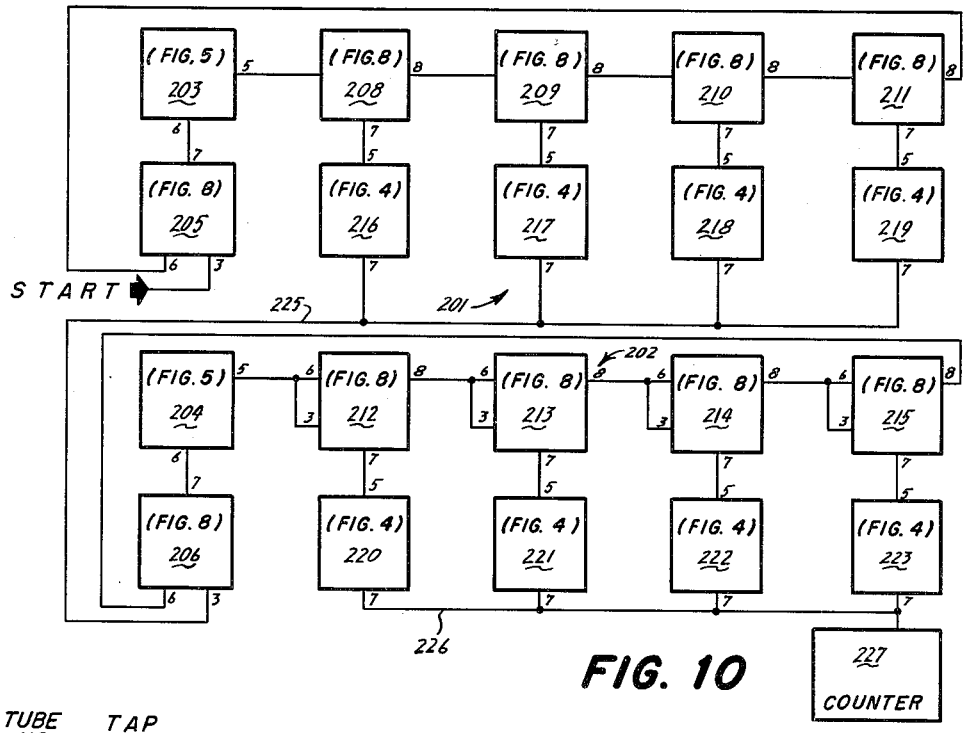

FIG. 10 is a diagram of the adder of the invention adapted for use as a multiplier.

Figure 11:
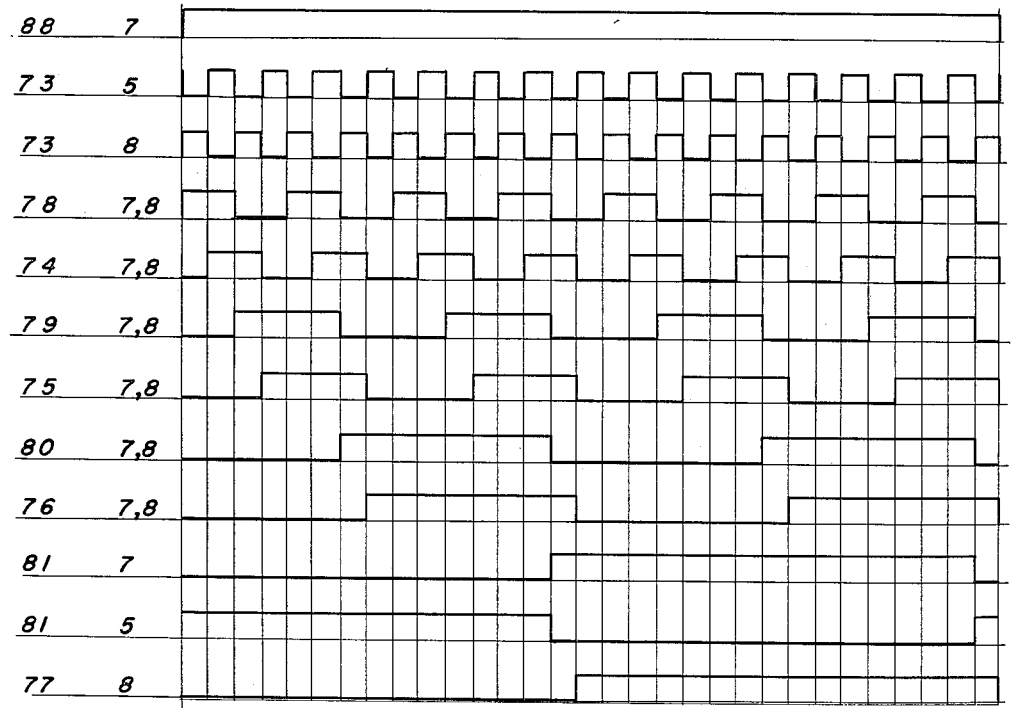

FIG. 11 is a timing chart representative of the voltage wave forms utilized to operate the adder.

Figure 1:
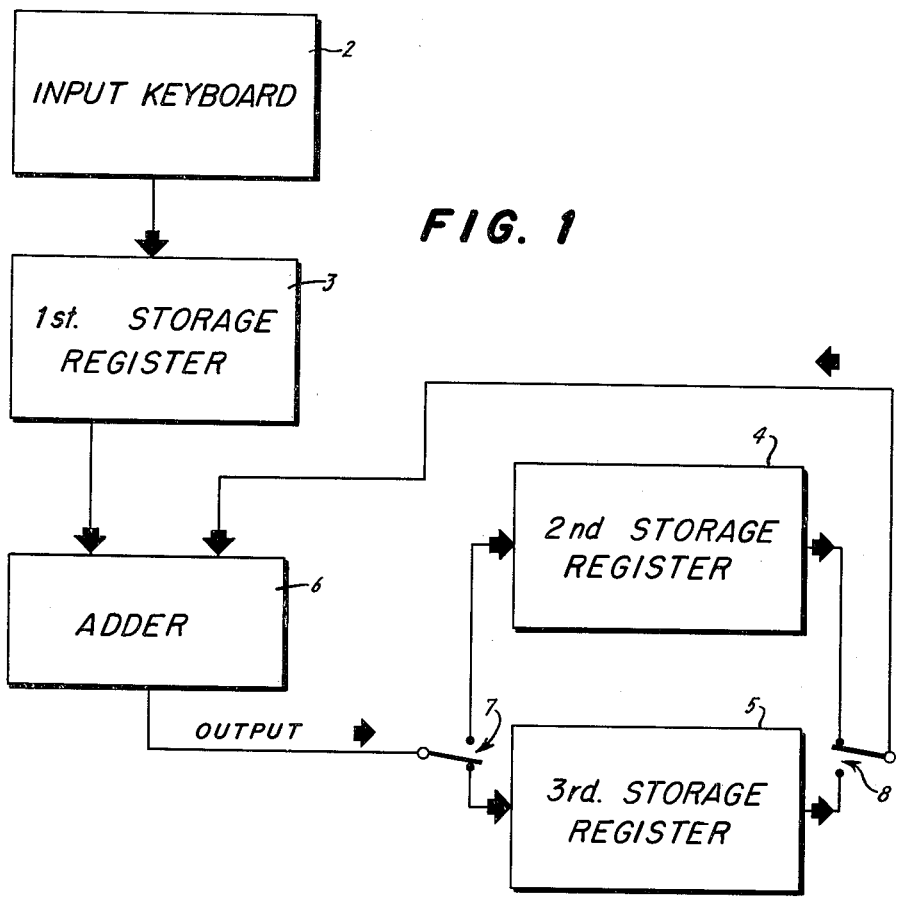
FIG. 1 is a block diagram of the adding machine of the invention.

Referring first to FIG. 1, the machine of the invention generally comprises an input keyboard 2, first, second and third storage registers 3, 4 and 5, respectively, and an adder 6. The storage register 3 is utilized as an input register while the registers 4 and 5 serve alternately as input and output registers, respectively, switching circuits 7 and 8 being provided for this purpose. With the switching circuits in the condition shown in the drawing, the contents of the first and second registers 3 and 4 are connected to the input of the adder 6, and the output of the adder is connected to the third register 5 into which the sum of the numbers stored in the first and second registers is entered. In order to add numbers, for example, the numbers X, Y and Z, all three registers are cleared and the number X is keyed into the first register 3. X is then added to the contents of the second register 4, i.e., is added to zero, and the sum, i.e., X+0, is entered into the third register 5. Registers 3 and 4 are then cleared and Y is entered into the register 3. At this time the switching circuits 7 and 8 are actuated and the contents of the registers 3 and 5 are totaled by the adder 6. The sum of X+Y is entered into the second storage register 4. Registers 3 and 5 are then cleared and Z is entered into the first register 3. It will be understood that the switching circuits 7 and 8 are again reversed and that the sum of the contents of the registers 3 and 4, i.e., the sum of X+Y+Z, is entered into the register 5. Thus, the registers 4 and 5 serve alternately as output registers depending upon whether or not an odd or an even quantity of numbers are totaled.

Figure 2:
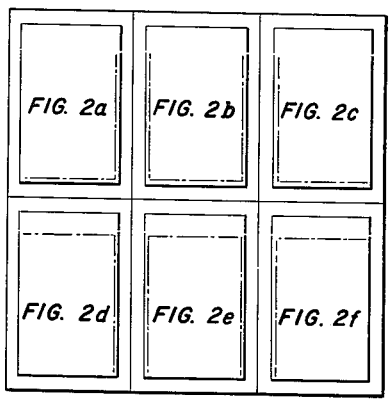
FIG. 2 shows the relative arrangement of FIGS. 2a through 2f.
Figure 2A:
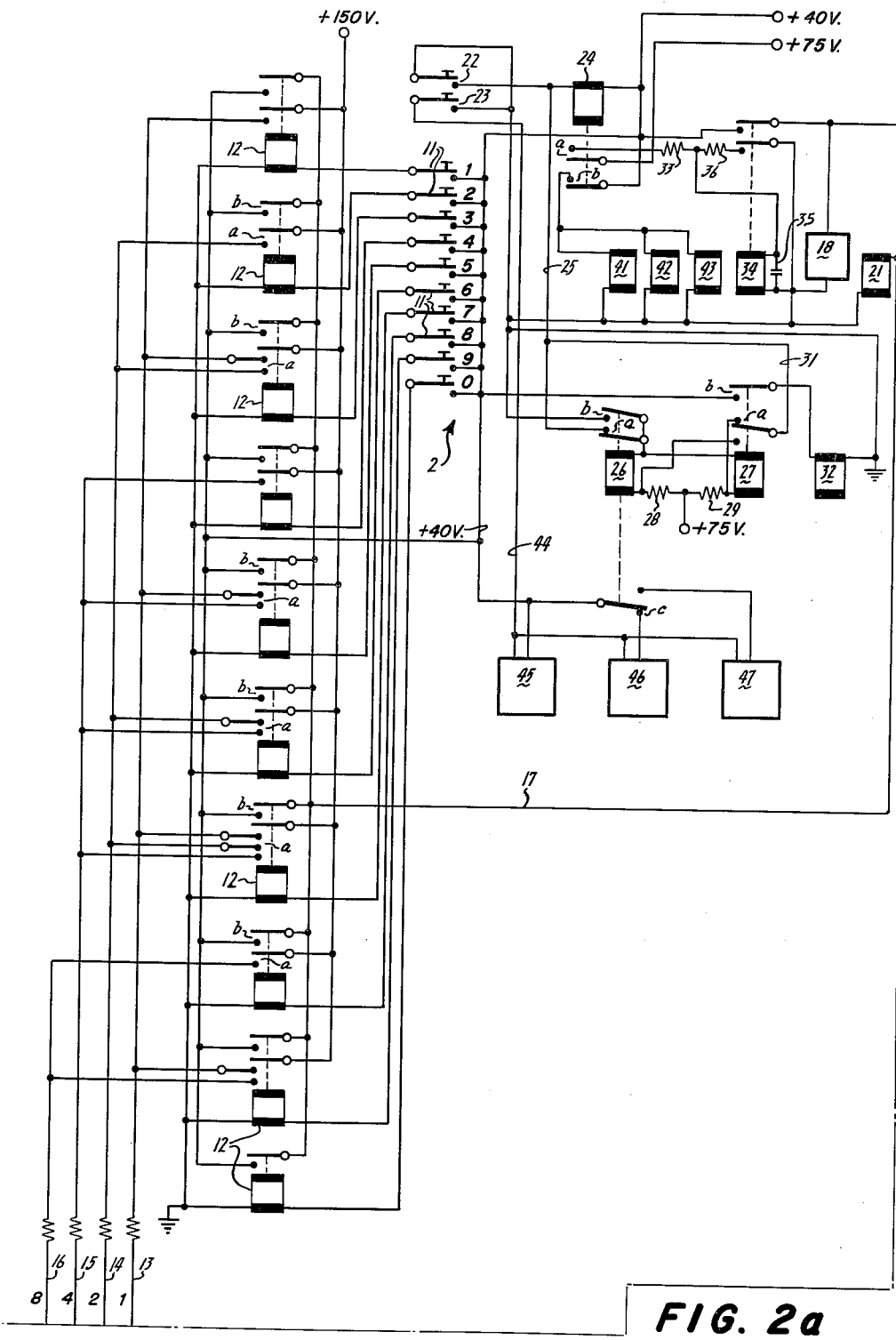

Referring now to FIG. 2a, the machine of the invention more specifically comprises the keyboard 2 which has ten digital input keys 11 labeled 0 through 9 as indicated in the drawing. Each of the keys 11 is associated with one of ten recoding relays 12, the contacts of which are arranged in a matrix in a well known manner to recode keyed decimal digits to binary form, the binary coded output being taken from four lines 13 through 16 having binary coded values of 1, 2, 4 and 8, respectively. The common side of the various a contacts of the several recoding relays 12 is connected to +150 volts, the other sides thereof being connected to the four output lines 13 through 16 in the manner common to such matrices. Thus, when one of the keys 11 is actuated, certain of the lines 13 through 16 are raised to a potential of +150 volts, depending upon the binary coded breakdown of the number associated with the particular key actuated.

Figure 2B:
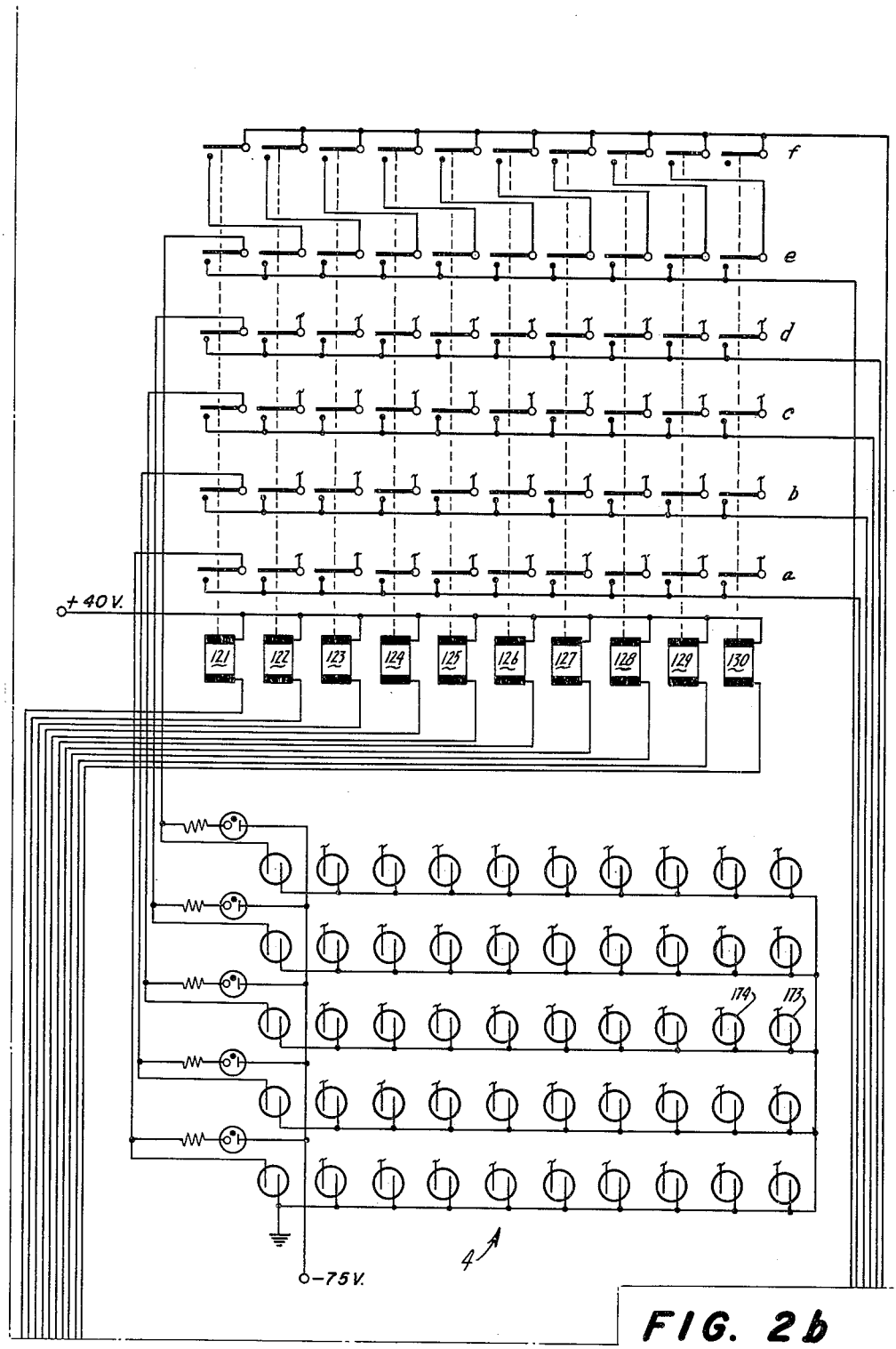
Figure 3:
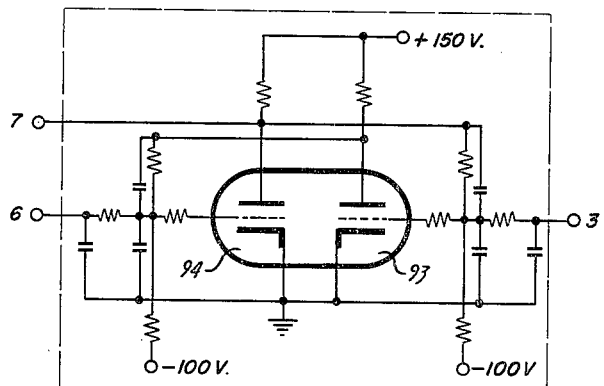
Figure 4:
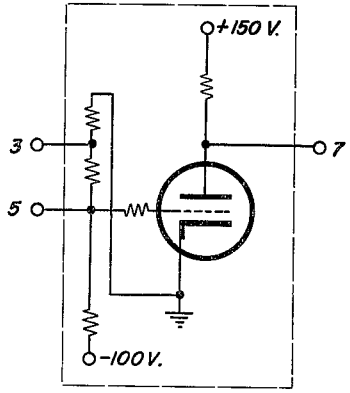
Figure 2C:
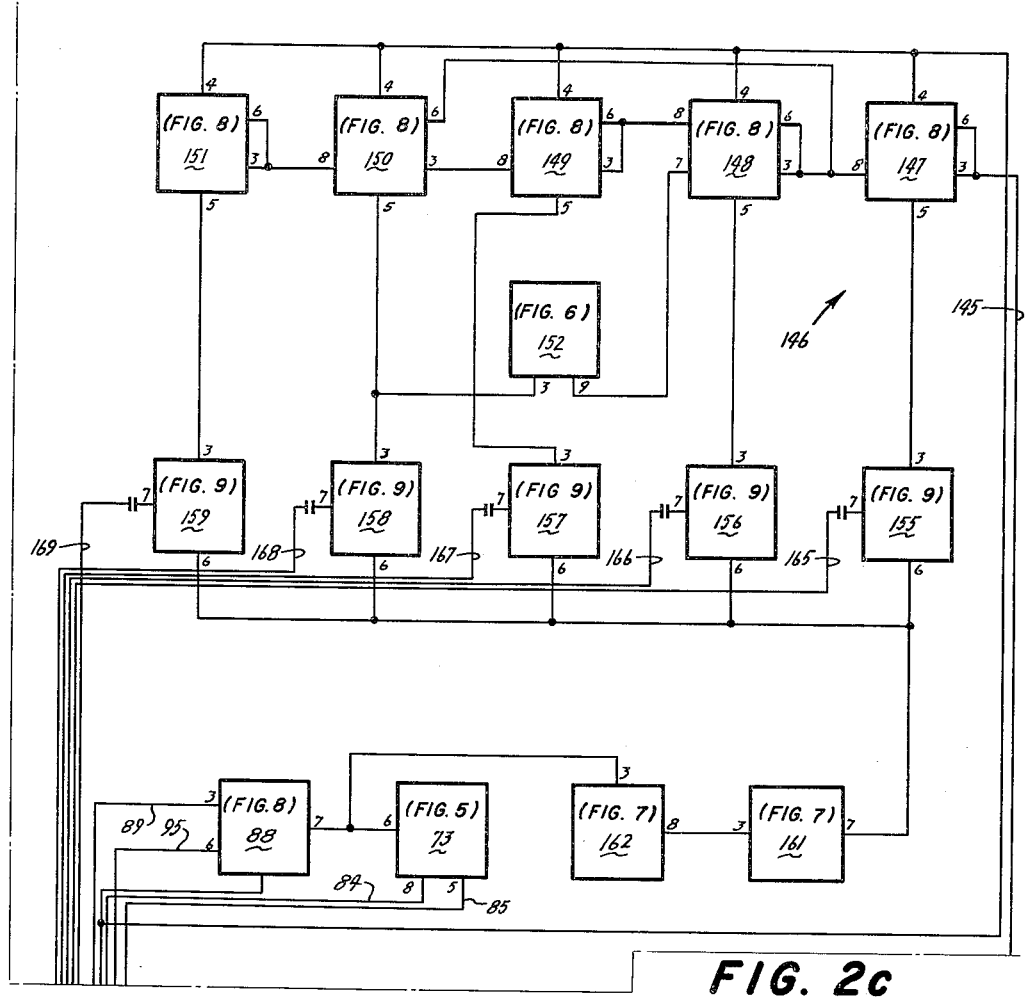
Figure 2D:
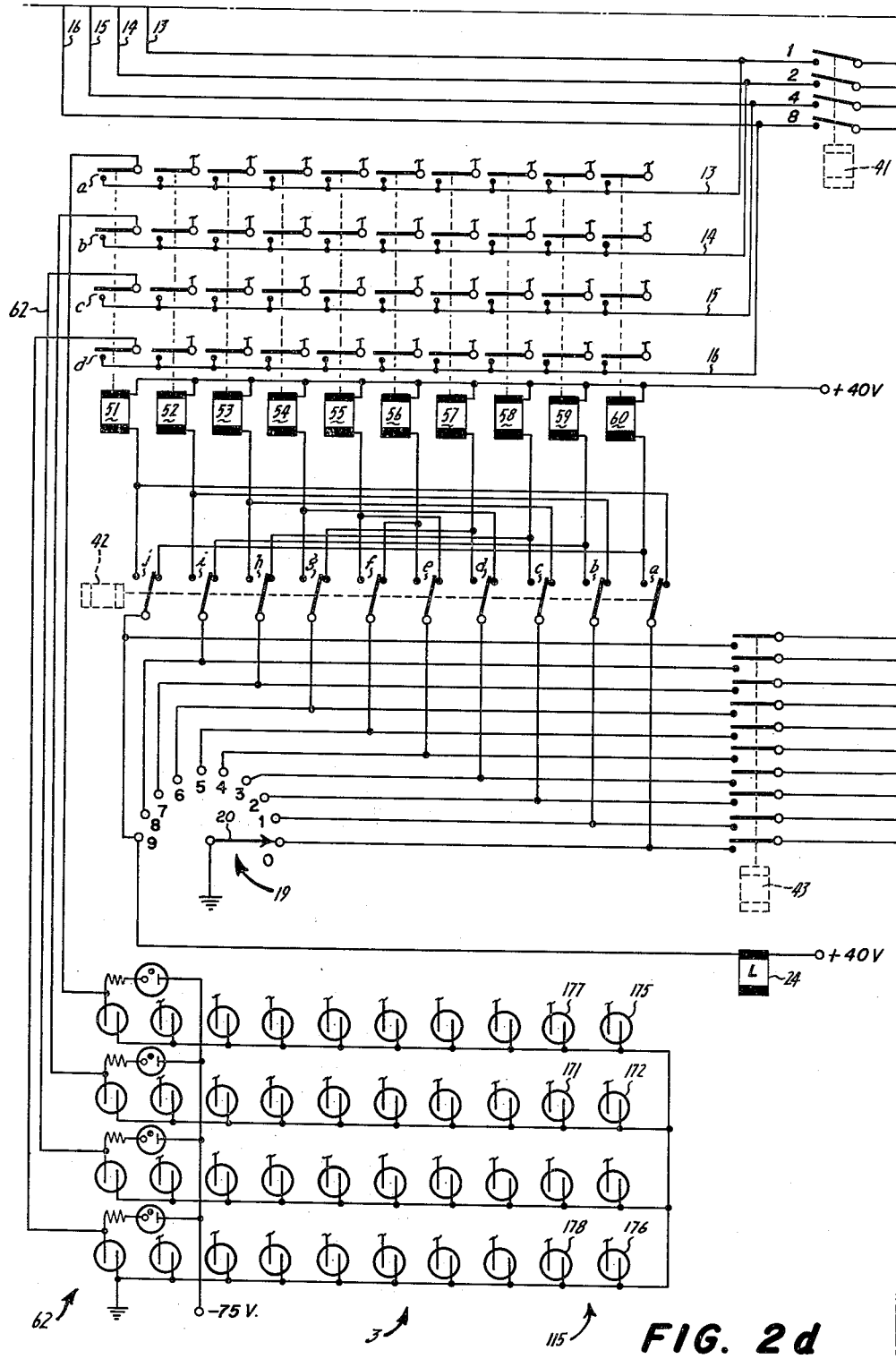
Figure 2E:
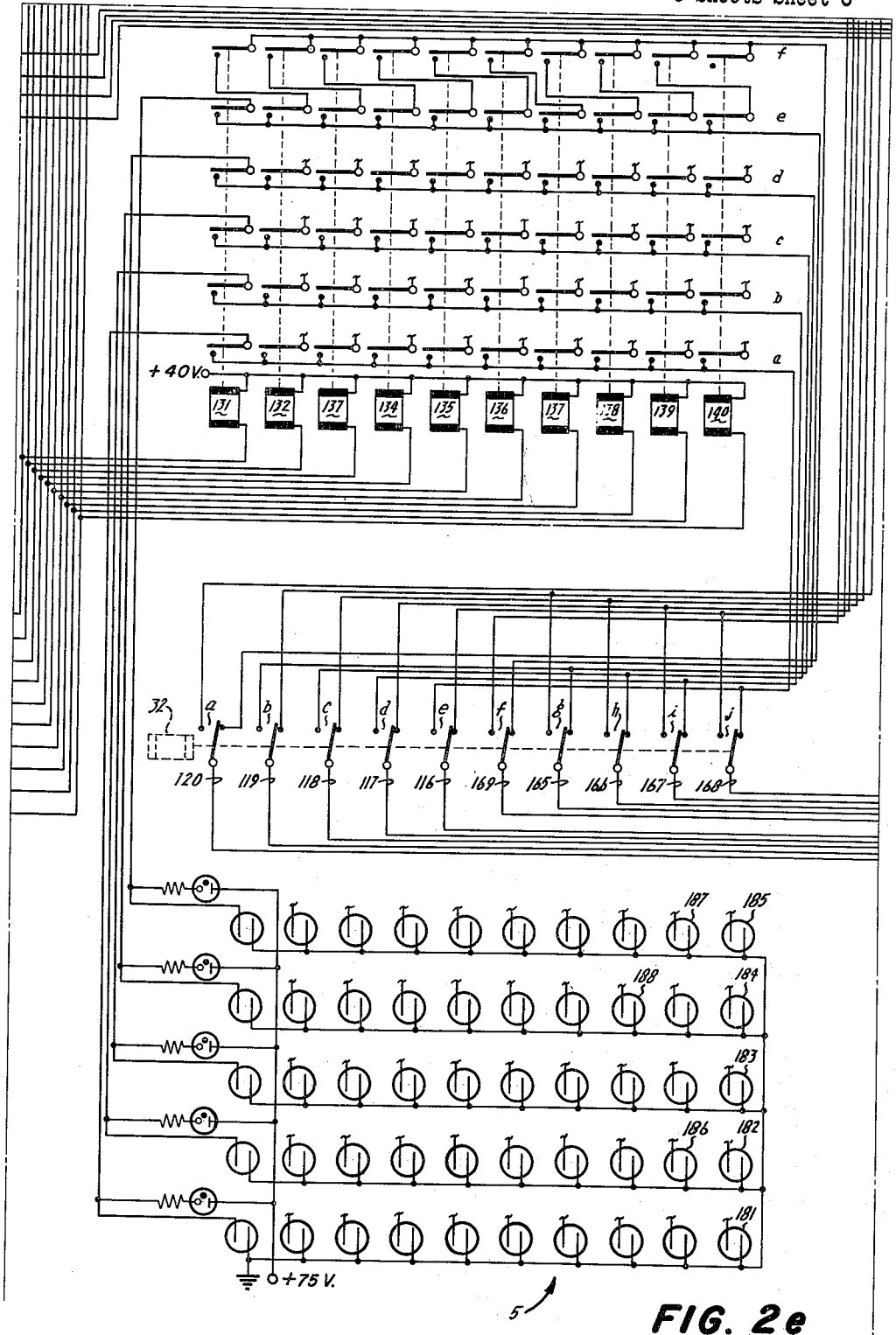
Figure 2F:
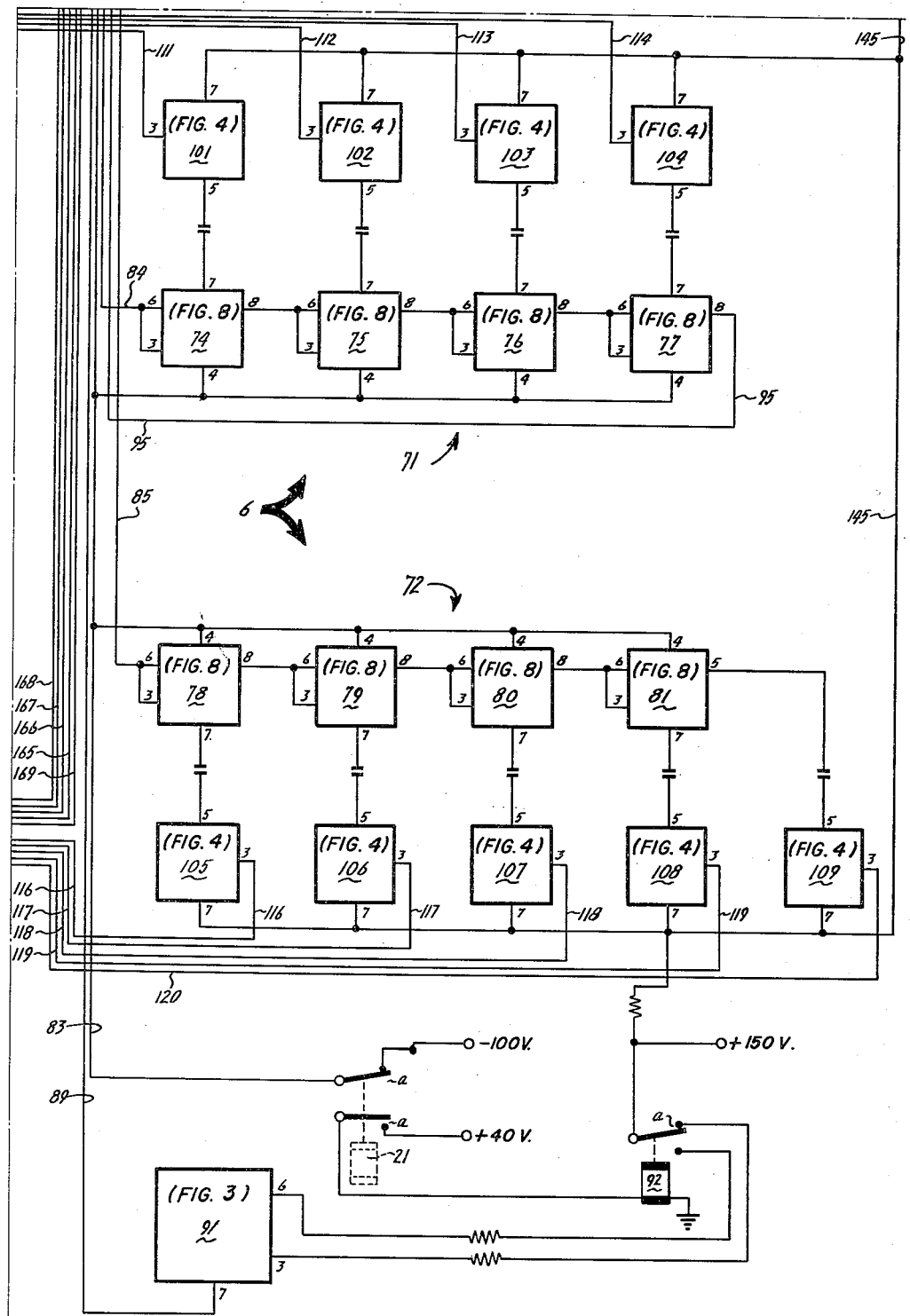

Additionally, when one of the recoding relays 12 is energized by the actuation of a key 11, its b contacts are closed. One side of each of the b contacts is connected to +40 volts, and the other sides thereof are connected by means of a line 17 to one side of the coil 18 of a stepping switch 19 (FIG. 2d). The stepping switch 19 is provided for reasons to become clear hereinafter. It will be understood at this time, however, that each time one of the keys 11 (FIG. 2a) is actuated, the step coil 18 is energized, and upon release of the key 11 the armature 20 of the stepping switch 19 is advanced to the next successive contact position. A relay 21 is arranged in parallel with the coil 18 of the stepping switch, and each time said coil is energized the relay 21 is also energized.

The keyboard 2 also includes an "add" key 22 and a "clear" key 23. One side of the add key is connected to ground and the other side thereof is connected through the winding of a relay 24 to +40 volts. The non-grounded side of the add key is additionally connected by means of a line 25 through the n/c a contacts of a relay 26 to one side of each of the relay 26 and a relay 27, the other side of each of these relays being connected through suitable current limiting resistors 28 and 29 to +75 volts. The n/o b contacts of the relay 26 are connected between ground and the common line between the relays 26 and 27. The relays 26 and 27 are arranged as a relay flip-flip wherein either both of them are energized or both of them are deenergized. When the add key is actuated the line 25 is grounded, thereby grounding one side of the relay 26 through the a contacts thereof and causing the relay 26 to pick up. When its contacts are transferred the relay 26 is held energized due to the ground circuit completed through its b contacts. Preferably, the add key 22 is in the form of a microswitch, and as soon as the add key is released the relay 27 picks up since at this time the short circuit thereacross is removed. When the relay 27 picks up its contacts are transferred and are held in their transferred condition until the add key is again actuated. At this time the relay 26 is shorted, causing it to drop out and opening the ground circuit to the relay 27, causing it also to drop out. Thus, each time that the key 22 is actuated, the relays are either picked up or dropped out. When the b contacts of the relay 27 are closed, as they are when the relay is energized, +40 volts is connected to one side of a relay 32. Since the other side of the relay 32 is grounded, it will be understood that it is energized when the relay 27 picks up.

It was mentioned above that the relay 24 is energized when the add key 22 is actuated. One side of the a contacts of the relay 24 is connected to +75 volts, the other side thereof being connected through a suitable voltage dropping resistor 33 and through the winding of a relay 34 to ground. The a contacts of the relay 34 are connected between ground and one side of a resistor 36, the other side of the resistor 36 being connected to the non-grounded side of the relay 34. Thus, when the relay 24 picks up, thereby closing its a contacts and connecting 75 volts across the resistor 33 and relay 34, the relay 34 picks up. However, as soon as its a contacts are closed, a shorting path around the relay 34 is provided, thereby permitting the deenergization thereof. As long as the a contacts of the relay 24 are closed (it should be noted here that the relay 24 is of the latch type and that when it is energized its contacts are latched in their transferred condition), the relay 34 picks up and drops out. A condenser 35 is connected across the winding of the relay 34 to determine its rate of oscillation, i.e., to regulate the frequency at which it picks up and drops out, to insure that enough time is allowed for the operation of the adder. The larger the condenser 35, the lower the frequency of oscillation.

The b contacts of the relay 34 are connected between 40 volts and one side of each of the step coil 18 and the relay 21, and each time the relay 34 picks up, as described above, the coil 18 of the stepping switch and the relay 21 are energized. In this way it will be seen that when the add key is actuated the armature of the stepping switch is successively advanced to its various contact positions until the contacts of the relay 24 are unlatched. The latch winding 24L (FIG. 2d) of the relay 24 is connected between the 9 contact of the stepping switch and +40 volts, and when the armature of the stepping switch is in engagement with the 9 contact the latch winding is energized, thereby unlatching the contacts of the relay 24. Opening of the a contacts of the relay 24 causes the relay 34 to drop out, thereby deenergizing the coil 18 of the stepping switch 19, due to the opening of the b contacts of the relay 34, and the armature 20 of the stepping switch is advanced from the 9 contact position to the 0 contact position. The 0 contact position is referred to hereinafter as the "home position" of the stepping switch. The b contacts of the relay 24 are connected between +40 volts and one side of each of three relays 41, 42 and 43, the other side of these relays being connected to ground, and as long as the contacts of the relay 24 are in their latched condition the relays 41, 42 and 43 are energized.

One side of the "clear" key 23 mentioned above is connected to ground, the other side thereof being connected through a line 44 to one side of each of three decohering solenoids 45, 46 and 47. These solenoids are provided for clearing the various storage registers 3, 4 and 5, as will be more fully described later herein. The other side of the solenoid 45, i.e., the side not common to the line 44, is connected to +40 volts. Similarly, the other sides of the solenoids 46 and 47 are connected through the n/c or n/o c contacts, respectively, of the relay 26 to +40 volts. Thus, when the relay 26 is in the condition shown, i.e., when it is not energized, the solenoids 45 and 46 are energized upon actuation of the clear key 23. However, while the relay 26 is energized, thereby transferring the c contacts thereof, the solenoids 45 and 47 are energized upon actuation of the clear key 23. Thus, on successive "add" cycles, the solenoids 46 and 47 are alternately energized.

Each of the binary output lines 13, 14, 15 and 16 (FIG. 2d) is connected to the common side of each of the a, b, c and d contacts, respectively, of ten relays 51 through 60, the other side of each of these 40 contacts being connected to one side of the corresponding one of 40 coherers, the other side of each of said coherers being grounded. These coherers comprise the first storage register 3 and may be of any convenient design, such as, for example, the coherer structure disclosed in the copending U.S. Patent application No. 423,193, filed in the name of R. B. Johnson on April 14, 1954. In the present embodiment coherers are utilized which are arranged to cohere when a potential in the neighborhood of 130 volts or more is placed across them.

One side of each of the relays 51 through 60 is common and is connected to +40 volts, the other sides of these relays being connected through both the n/c contacts a to j inclusive, respectively, of the relay 42 to the taps 0 through 9, respectively, of the stepping switch 19 and also through the n/o contacts j to a inclusive, respectively, of the relay 42 to the corresponding stepping switch contact 9 through 0, respectively. Since the armature 20 of the stepping switch 19 is grounded, it will be seen that when the stepping switch is in the position shown in the drawings, the relay 42 being deenergized, the relay 51 is energized since a circuit is then established from 40 volts through the relay 51, through the n/c a contacts of the relay 42 and through the armature of the stepping switch 19 to ground. At this time the a, b, c and d contacts of the relay 51 are transferred. As the armature of the stepping switch is successively advanced through the various contact positions, the relays 52 through 60 are successively energized. The order of energization of the relays 51 to 60 inclusive is reversed when the relay 42 is energized, as it is, it will be recalled, when the add key has been depressed, since its contacts a through j are transferred at this time, thereby successively connecting the contacts 0 through 9 to successive ones of the relays 60 through 51 in that order.

Assuming now, for example, that the relay 42 is in the condition shown and that the relay 51 is energized due to the armature 20 being positioned in engagement with the 0 contact of the stepping switch, the keying of a digit into the machine momentarily connects 150 volts across certain of the coherers in the first row 62 of the storage register 3 corresponding to the binary coded value of the keyed digit. At this time the energized coherers are fired and the digit is stored therein. Successive digits of the number entered via the keyboard 2 are stored in successive orders of the coherer storage register in a similar manner, since each time one of the keys 11 is actuated, the armature 20 of the stepping switch 19 is advanced to the next successive contact position, thereby successively energizing the relays 51 through 60.

Numbers to be added are entered into the machine serially, the highest order digit first, and it should be noted that in the present embodiment it is necessary for the operator to first enter a number of ciphers preceding the entry of the number to thereby place the various orders of the number in the correct order of the storage coherers; i.e., assuming that a three-digit number is to be entered into the machine, it is necessary first to enter seven ciphers preceding the number to thereby place these digits in the 8th, 9th and 10th rows of the storage register.

In order to perform addition, it will be recalled that it is first necessary to clear the machine by decohering any of the coherers in the registers 3, 4 and 5, which may have been fired previously. If it be assumed that the relay 26 is initially in the condition shown in the drawing, actuation of the clear key 23 (FIG. 2a) energizes the solenoids 45 and 46. Since each of the solenoids 45, 46 and 47 is arranged, when energized, to provide a mechanical jar to its corresponding coherer register 3, 4 and 5, respectively, sufficient to cause any or all of the coherers therein to decohere, the registers 3 and 4 are cleared at this time. To clear the third register 5, it is necessary again to actuate the add key 22, to thereby cause the transfer of the c contacts of the relay 26, and again to hit the clear key 23. After clearance in this manner, the first number to be added is entered by means of the keyboard 2 into the register 3. The add key 22 is again actuated and the number in the first register 3 is added by the adder 6 to the zero stored in the third register 5, and the sum thereof is entered into the second register 4, the relay 32 being energized at this time. The clear key 23 is again depressed, thereby clearing registers 3 and 5, and the second number is entered into the register 3. Actuation of the add key then controls the deenergization of the relay 32 and the sum of the numbers in registers 3 and 4 is determined by the adder 6 and is entered into the register 5.

Figure 8:
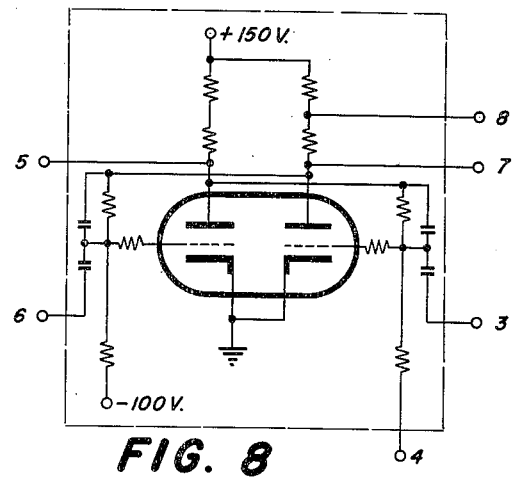
Figure 6:
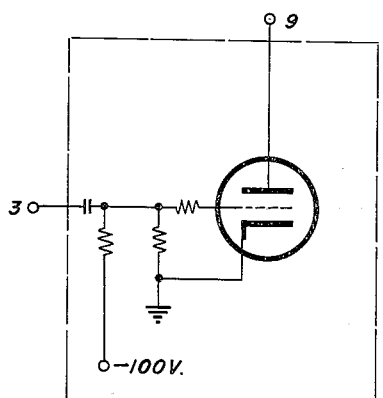
Figure 9:
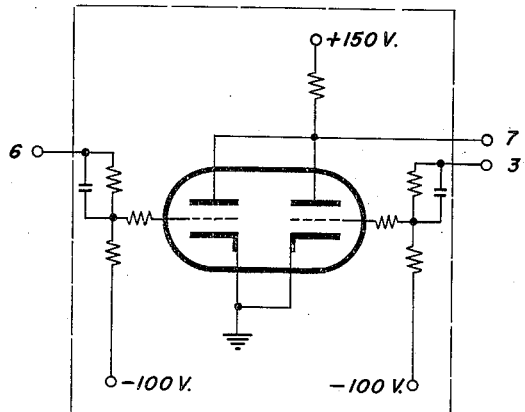

The disclosed adder 6 comprises an important feature of the present invention, although it is to be understood that other types of adding mechanisms may be employed with the remaining circuitry provided herein. It should also be understood that the adder 6 is not restricted to use with the disclosed circuitry but is readily adaptable to a wide variety of applications, as will become obvious. The adder 6 (FIG. 2f) is arranged to convert two binary coded digits entered therein to a stream of pulses equal in number to the sum of the digits, and includes two 4-stage binary counters or emitters 71 and 72 driven 180° out of phase by pulses taken from opposite plates of a multivibrator 73 (FIG. 2c). The multivibrator 73 is shown only in block form in FIG. 2c, the detailed circuitry thereof being shown in FIG. 5. Each of the emitters 71 and 72 (FIG. 2f) comprises four bistable triggers 74 through 77 and 78 through 81, respectively, which are identical to one another and one of which is disclosed in detail in FIG. 8. Referring to FIG. 8, the bistable trigger there shown is operated to reverse its condition of stability by the negative-going edges of pulses applied to the grid circuits thereof. Since this type of trigger is well known in the art, it is deemed that this brief description will suffice. It is to be noted, however, that the #4 tap of each of the triggers 74 through 81 is returned through a line 83 and through the n/c a contacts of the relay 21 to −100 volts, and it will be understood that when the relay 21 is energized, as it is each time the coil of the stepping switch is energized, the −100 volts is disconnected from the #4 taps, thereby resetting each of the triggers 74 through 81 in such a way that the #7 and #8 taps thereof are low. While the relay 21 is energized, all triggers are inoperative, due to the open circuit in the reset line 83, since during this period no calculation is performed.

The various triggers 74 through 77 (FIG. 2f), like the triggers 78 through 81, are arranged in series, the output tap #8 of the trigger 74 being connected to the input taps #3 and #6 of the trigger 75, the output tap #8 of the trigger 75 being connected to the input taps #3 and #6 of the trigger 76, etc. The #3 and #6 taps of the trigger 74, i.e., the input taps to said trigger, are connected by a line 84 to the #8 tap of the multivibrator 73 (FIG. 2c), the #5 tap of the multivibrator 73 being connected by a line 85 to the #3 and #6 taps of the trigger 78.

Figure 5:
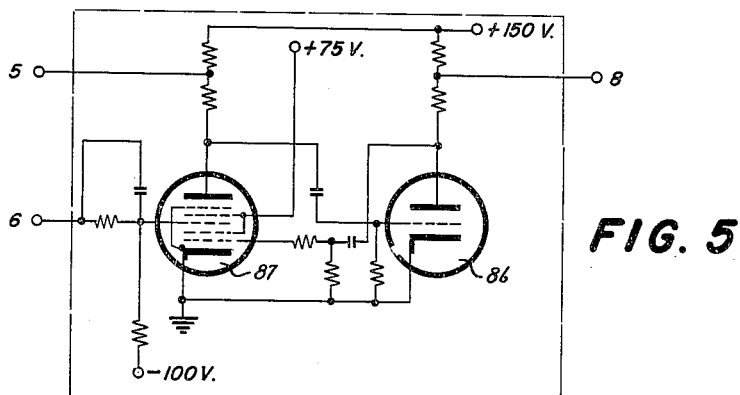
Figure 7:
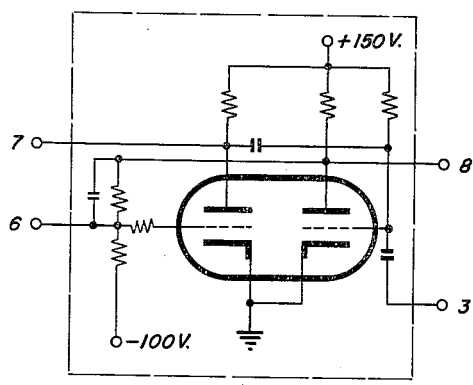

Referring to FIG. 5, the multivibrator 73 comprises two tubes 86 and 87, the tube 86 thereof being arranged normally to conduct and the tube 87 being normally cut off. When the potential of the #6 tap thereof goes up, however, the tube 87 will conduct and the multivibrator will oscillate as long as the #6 tap remains up. While it is oscillating, therefore, positive-going pulses are taken from the #8 tap and negative-going pulses are taken from the #5 tap of the multivibrator 73. It was mentioned earlier that each of the triggers 74 and 78 (FIG. 2f) is operated by the negative-going edges of pulses applied to the input taps thereof, and it will be understood, therefore, that these triggers are operated 180° out of phase and that they in turn drive their corresponding emitters in this manner, since they are driven by pulses taken from the #8 and #5 taps, respectively, of the multivibrator 73 (FIG. 2c).

The #6 tap of the multivibrator 73 is connected to the #7 tap of a trigger 88, which trigger is identical to the aforementioned triggers 74 through 81 and is used to control the operation of the multivibrator 73. The #3 tap of the trigger 88 is connected by means of a line 89 to the #7 tap of a key trigger 91, the #6 tap of which is connected through the n/o a contacts of a relay 92 to +150 volts and the #3 tap of which is connected through the n/c a contacts of a relay 92 to +150 volts. The key trigger is disclosed in detail in FIG. 3 and is arranged to operate upon application to the #6 tap thereof of positive voltages. As long as the #3 tap of the key trigger 91 is connected through the a contacts of the relay 92 (FIG. 2f) to +150 volts, the tube 93 thereof conducts, the tube 94 being cut off. However, when the relay 92 is energized, thereby placing 150 volts on the #6 tap of the trigger 91, this condition is reversed. When the relay 92 is not energized, i.e., when its contacts are in the condition shown in the drawing, the #3 tap of the trigger 91 is high, thereby controlling the potential of the #7 tap thereof to be high. The trigger 88 (FIG. 2c) is reset in the same manner that the triggers 74 through 81 are reset, and thus the #7 tap thereof is initially low. When the relay 92 (FIG. 2f) is energized, its a contacts are transferred and the potential of the #7 tap of the key trigger 91 drops. This controls the #3 tap of the trigger 88 (FIG. 2c) to drop, thereby reversing the condition of stability of said trigger and raising the #7 tap thereof. When the #7 tap of the trigger 88 goes up, it will be recalled, the multivibrator 73 is turned on, and it oscillates until the #7 tap of the trigger 88 again drops. The #8 tap of the trigger 77 (FIG. 2f) is connected by means of a line 95 to the #6 tap of the trigger 88, and when the potential of the #8 tap of the trigger 77 drops, as it does on the negative-going edge of the 16th pulse generated by the multivibrator 73, the condition of stability of the trigger 88 is again reversed, thereby lowering the potential of the #7 tap thereof and turning off the multivibrator. Upon energization of the relay 92 (FIG. 2f), therefore, the multivibrator is turned on, and it is not until 16 pulses have been generated thereby that it is again turned off.

The #7 taps of the triggers 74 through 77 (FIG. 2f) are coupled to the #5 taps of four gates 101 through 104, respectively, the #7 taps of the triggers 78 through 81 being coupled to the #5 taps of four gates 105 through 108 and the #5 tap of the trigger 81 being coupled to the #5 tap of a gate 109. All of the gates 101 through 109 are identical and one such gate is disclosed in detail in FIG. 4. Each of the gates comprises a triode normally biased well below cutoff, and as long as the #3 tap thereof is not grounded, positive pulses taken from the output of the corresponding trigger 74 through 81 and applied to the #5 tap are insufficient to cause the tube to conduct. However, when the #3 tap is grounded, such pulses cause the tube to conduct momentarily, thereby controlling the #7 tap to drop momentarily.

The #3 taps of the gates 101 through 104 are connected by means of lines 111 through 114 (FIGS. 2f, 2e and 2d) and through the d, c, b and a contacts, respectively, of the relay 41 (FIG. 2d) to the lines 16, 15, 14 and 13, respectively. It will be recalled that the relay 41, as well as the relays 42 and 43, is energized during an adding cycle, i.e., when the add key 22 is depressed. Thus, after the add key is actuated and when the armature 20 of the stepping switch 19 is in its home position, the relay 60 is energized (the relay 42 being energized at this time) and the a, b, c and d contacts thereof are closed, thereby connecting one side of the coherers in the row 115 of the storage register 3 to the corresponding lines 111 through 114. Since the resistance of fired coherers is very low, those of the gates 101 through 104 (FIG. 2f) corresponding to fired coherers in the row 115 (FIG. 2d) are opened since the #3 taps thereof are shorted through the fired coherers to ground.

The #3 tap of each of the gates 105 through 108 is connected by means of four lines 116 to 119 inclusive, through the n/c e, d, c and b contacts, respectively, of the relay 32 (FIG. 2e) to the common side of the a, b, c and d contacts, respectively, (FIG. 2b) of ten relays 121 through 130. The other side of each of the various contacts of the relays 121 through 130 is connected to one side of the corresponding one of the 50 coherers which form the second coherer storage register 4, and as in the storage register 3, the other side of each of these coherers is grounded. Thus, each of the gates 105 through 108 (FIG. 2f) is controlled to open by the condition of the coherers in the various rows of the register 4 in the same manner that the gates 101 through 104 are controlled by the coherers of the register 3, as long as the contacts of the relay 32 are in the condition shown in the drawing.

When the relay 32 is energized, however, thereby transferring its various contacts, the lines 116 through 119 are connected through the n/o contacts e through b respectively, of the relay 32 (FIG. 2e) to the common side of each of the a, b, c and d contacts of ten relays 131 through 140. The relays 131 through 140 control the selection of the various rows of coherers of the storage register 5 in the same manner that the relays 121 through 130 control the selection of the rows of coherers of the register 4. Thus, the #3 taps of the gates 105 through 108 (FIG. 2f) are alternately associated with the storage registers 4 and 5, depending upon the state of energization of the relay 32 (FIG. 2e), and in this way certain of the gates 105 through 108 corresponding to fired coherers in a particular row of the register 4 or 5 being scanned at any particular time are opened.

As mentioned above #5 tap of the trigger 81 (FIG. 2f) is coupled to the #5 tap of the gate 109, the #3 tap of said gate being connected by a line 120 through the n/c a contacts (FIG. 2e) of the relay 32 to the common side of the f contacts of the relays 131 to 140 inclusive. The #3 tap of the gate 109 is additionally connected by means of the line 120 through the n/o a contacts of the relay 32 to the common side of the f contacts of the relays 121 to 130 inclusive (FIG. 2b). As will become clear, pulses passing through the gate 109 are "carry" pulses and said gate is opened when there is a "carry" from the addition of a preceding order of digits to be added to the order being added at that time.

The relay 92 (FIG. 2f) is connected between ground and through the n/o b contacts of the relay 21 to +40 volts. It will be recalled that the relay 21 (FIG. 2a) is connected in parallel with the coil 18 of the stepping switch and that it is energized each time the relay 34 picks up. Each time the relay 21 is energized, therefore, its b contacts are closed and the relay 92 is energized. Additionally, it should be noted that when the relay 21 picks up, its a contacts (FIG. 2f) are opened, thereby resetting the various triggers 74 through 81 and 88. When the relay 92 picks up, as described above, the multivibrator 73 (FIG. 2c) is turned on and pulses taken from the #8 and #5 taps thereof are entered into the emitters 71 and 72, respectively.

The #7 tap of each of the triggers 74 through 81 (FIG. 2f) is coupled to the #5 tap of the corresponding gate 101 through 108 and the #5 tap of the trigger 81 is coupled to the #5 tap of the gate 109. The #7 taps of the various gates 101 through 109 are connected to a common line 145, and when the #7 tap of one of the triggers 74 through 81 goes up in potential (assuming that gate to be open), the line 145 drops in potential since when the #7 tap of one of the triggers 74 through 81 goes up the associated open gate conducts. It was mentioned earlier herein that the emitters 71 and 72 are operated by pulses taken from the #8 and #5 taps, respectively, of the multivibrator 73, which pulses are 180° out of phase, and since the triggers 74 and 78 are caused to operate only by the negative-going edges of these pulses, the pulses present on the line 145 taken from the #7 taps of the various gates are separate and distinct.

The triggers 74 and 78 are controlled to reverse their condition of stability by the negative-going edge of each pulse taken from the #8 and #5 taps, respectively, of the multivibrator 73, and therefore the #7 and #8 taps of the triggers 74 and 78 drop in potential each 2nd multivibrator pulse. In a similar manner, the #7 and #8 taps of the triggers 75 and 79 reverse their condition of stability each 4th multivibrator pulse, the #7 and #8 taps of the triggers 76 and 80 and 77 and 81 being arranged to reverse their condition each 8th and 16th multivibrator pulse, respectively. The triggers 74 through 77, like the triggers 78 through 81, have binary coded values of 8, 4, 2 and 1, the #7 taps of the triggers 74 and 78 being arranged to go up in potential eight times during each operating period of the multivibrator 73. Similarly, the #7 and #8 taps of the triggers 75 through 77 and 79 through 81 are arranged to rise in potential four times, twice and once, respectively, during each multivibrator period. The #5 tap of the trigger 81 goes up during the 16th multivibrator pulse, and if there is a carry from the addition of a prior order, the #7 tap of the gate 109 drops at this time (see FIG. 11).

When adding numbers, the gates 101 through 104 are operated in a manner corresponding to the binary coded value of one of the two digits to be added, and the gates 105 through 108 are operated according to the binary coded value of the second of the two digits, the gate 109 being operated only by a carry digit from the sum of a preceding order. When the multivibrator 73 is turned on, the pulses taken from the output of each stage of the emitters 71 and 72 pass through those gates that are open and appear on the line 145 as distinct pulses equal in number to the sum of the two digits. This is true since the #7 tap of each trigger 74 to 81 inclusive goes up at a different time in a given cycle of operation (see FIG. 11). When the gate 109 is open, one additional pulse is transmitted to the line 145, thereby adding a carry digit to the number of pulses. The line 145 is connected to the input of a binary counter 146 (FIG. 2c) which comprises five triggers 147 through 151. Each of these triggers is identical to the triggers 74 through 81 described previously and is shown in detail in FIG. 8. The triggers 147 through 151 are reset in the same manner as the aforementioned triggers 74 through 81 in such a way that the #7 and #8 taps are initially low, the #5 taps thereof being initially high. The first four stages of the counter, i.e., the triggers 147 to 150 inclusive, are arranged in such a manner that they are restored to zero on each 10th input pulse, and each 10th pulse controls the #8 tap of the 4th stage, i.e., the trigger 150, to drop, thereby entering any carry that might be present into the trigger 151.

The counter 146 is of a well known variety and therefore it will be only briefly described herein. The line 145 is connected to the #3 and #6 taps of the trigger 147, the #8 tap of which is connected to the #3 and #6 taps of the trigger 148 as well as to the #6 tap of the trigger 150. The #8 tap of the trigger 148 is connected to the #3 and #6 taps of the trigger 149, the #7 tap of the trigger 148 being connected to the #9 tap of an inverter 152. The #8 tap of the trigger 149 is connected to the #3 tap of the trigger 150, the #8 tap of which is similarly connected to the #3 and #6 taps of the trigger 151. It will also be noted that the #3 tap of the inverter 152 is connected to the #5 tap of the trigger 150. The inverter 152 is provided to control the trigger 150 to reverse its condition of stability when the 10th pulse taken from the line 145 is applied to the trigger 147, at which time a zero is registered in the counter. Also, on the 10th pulse, since the #8 tap of the trigger 150 drops, the condition of stability of the trigger 151 is reversed and the #5 tap thereof drops. Thus, when the #5 tap of the trigger 151 is low, a carry digit is stored therein. In a similar manner it will be understood that when the #5 taps of the triggers 147 through 150 are low, an 8, 4, 2 or 1, respectively, is stored therein.

The #5 taps of the triggers 147 through 151 are connected to the #3 taps of five "and" gates 155 through 159, respectively. Each of the gates 155 through 159 is shown in detail in FIG. 9 and comprises two normally conducting triodes, the plates of which are connected to a common load. The #7 tap of each of these gates is, therefore, normally low, and it is necessary that both triodes thereof be cut off before the #7 tap can go up. Thus, it is necessary that the potential of both the #3 and #6 taps of any one of these gates be lowered below cut-off to cause the #7 tap of that gate to go up.

The #6 taps of the gates 155 through 159 are connected together to the #7 tap of a single-shot multivibrator 161. The single-shot 161 is shown in detail in FIG. 7 and is arranged in such a way that the right-hand tube thereof normally conducts, the left-hand tube normally being cut off. Thus, the #8 tap of the single-shot 161 is normally low and the #7 tap thereof is normally high, and negative pulses applied to the #3 tap will cause this condition to be reversed for the period of the multivibrator. The #3 tap of the single-shot 161 is connected to the #8 tap of another single-shot 162 which is identical thereto and the #3 tap of which is connected to the #7 tap of the trigger 88. The single-shot multivibrators 161 and 152 are arranged to provide a sufficient delay to permit the entry of all of the pulses into the counter 146 taken from the line 145 before the gates 155 through 159 are conditioned for read-out. Thus, when the #7 tap of the trigger 88 drops, as it does at the end of a cycle of operation of the multivibrator 73, as described above, the single-shot 162 is triggered, thereby causing the #8 tap thereof to rise for a short period. Again, when the #8 tap of the single-shot 162 drops, the single-shot 161 is triggered and the resulting negative-going pulse taken from the #7 tap thereof is applied to the #6 tap of each of the "and" gates 155 through 159. This pulse controls read-out from the triggers 147 through 151 and is transmitted through those of the "and" gates 155 through 159 corresponding to triggers 147 through 151 having binary coded digits stored therein.

The read-out pulses which pass through the gates 155 to 159 inclusive are coupled through lines 165 to 169 inclusive and through the n/c contacts j through f, respectively, of the relay 32 (FIG. 2e) to the common side of each of the d, c, b, a and e contacts, respectively, of the relays 131 through 140. Additionally, it will be noted that the output of the "and" gates 155 through 159 (FIG. 2c) is coupled through the n/o contacts j through f, respectively, (FIG. 2e) of the relay 32 to the common side of each of the d, c, b, a and e contacts, respectively, of the relays 121 through 130 (FIG. 2b). Those numbers entered into the counter 146 from the adder 6 through the line 145 are read therefrom into either of the storage registers 4 or 5, depending upon the state of energization of the relay 32, as will be more fully described in connection with the operation of the machine.

To tie the various functions of the machine together and to thereby clarify the invention, a complete description of operation is given. Let it be assumed, for example; that two numbers, 22 and 99, are to be added by the machine of the invention. It is first necessary to actuate the clear key 23 (FIG. 2a) to thereby energize the solenoids 45 and 46 to clear the coherer banks of the coherer registers 3 and 4. Since it is necessary to clear all three registers 3, 4 and 5 prior to operation, the add key is next actuated to place the solenoid 47 in the "clear" circuit due to the resultant energization of the relay 26. Additionally, when the add key is actuated, the armature 20 of the stepping switch is advanced to its home position. Reactuating the clear key then clears the register 5. Now the first of the two numbers to be added, i.e., the number 22, is entered into the machine via the keyboard 2. To insure that the digits 22 are entered into the proper orders of storage register 3, eight ciphers are keyed prior to the entry of the 2's. Each time one of the keys 11 of the keyboard 2 is released, the stepping switch is advanced to the next successive contact position, thereby successively energizing the relays 51 through 60. The entry of the eight ciphers thereby controls the armature 20 to move to the #8 contact of the stepping switch, at which time the relay 59 is energized. Actuation of the #2 key places 300 volts on the line 14 and through the b contacts of the relay 59 to one side of a coherer 171 (FIG. 2d) in the register 3, thereby causing said coherer to fire. When the #2 key is released, the step coil 18 is deenergized and the armature 20 is advanced to contact position 9. The second 2 of the number 22 is then similarly entered into the coherer 172 of register 3.

At this time, it will be recalled, it is desired to transfer the data stored in the register 3 to one or the other of registers 4 to 5. This is accomplished by actuating the add key 22 (FIG. 2a). When the add key is depressed, the relay 24 is energized and its contacts are latched in their transferred condition, thereby energizing the relays 41, 42 and 43 until the contacts of the relay 24 are unlatched. Additionally, when the add key is depressed, the relays 26 and 27 are energized and are maintained in this condition until the add key is again depressed. Also, while the contacts of the relay 24 are latched in their transferred condition the step coil 18 and the relay 21 are intermittently energized to thereby control the armature 20 of the stepping switch 19 to be automatically advanced through the various contact positions. Since the relay 43 is now energized, the contacts 0 through 9 of the stepping switch are connected across the corresponding relays 140 through 131 (FIG. 2e) and 130 through 121 (FIG. 2b), causing these relays to be successively picked up in the same manner as the relays 60 through 51 (FIG. 2d) as the armature is moved through the various contact positions.

As noted above, the relay 42 (FIG. 2a) is energized when the add key is depressed, thereby transferring its contacts a through j (FIG. 2d), and it will be seen that this results in the connection of the contacts 0 through 9 of the stepping switch to the relays 51 through 60 in the reverse order. This permits the data stored in the register 3 to be read therefrom in reverse order, i.e., the lowest order digit first. Thus, when the armature 20 is in engagement with the 0 contact of the stepping switch, the relay 60 is energized and the line 14 is connected to ground through the b contacts thereof and through the fired coherer 172. Since the relay 41 (FIG. 2a) is also energized at this time, its contacts a to d inclusive (FIG. 2d) are transferred and the line 113 which is connected to the #3 tap of the gate 103 (FIG. 2f) is also at ground potential, thereby opening the gate 103. The gate 103, therefore, is opened almost simultaneously with the closing of the add key 22.

The relay 34 (FIG. 2a) picks up when the a contacts of the relay 24 are closed, and as soon as it does, the step coil 18 and the relay 21 are energized (it should be remembered that the armature of the stepping switch is not advanced until the coil thereof is deenergized). When the relay 21 picks up, its a contacts reset the various triggers in the adder and counter. Additionally, when the relay 21 picks up and after a short delay provided by the pick-up time of the relay 92, the key trigger 91 is operated, thereby turning on the multivibrator 73.

Each of the input lines 116 through 120 (FIG. 2f) to the emitter 72 of the adder 6 is connected through the various n/o contacts e through a, respectively, of the relay 32 (FIG. 2e) and through the various n/o contacts of the relays 121 through 130 (Fig. 2b) to the various orders of the coherers of the storage register 4 which, it will be recalled, is empty at this time since it was cleared prior to the entry of the first number. If it be assumed that the relay 32 is energized at this time, due to the relay flip-flop comprising relays 26 and 27 (FIG. 2a) being energized, each of the gates 105 through 109 is closed, since none of the coherers in the register 4 are fired. Thus, the gate 103 is the only one associated with the adder 6 that is open, and when the multivibrator 73 commences its cycle of operation, the only pulses therefrom which appear on the line 145 are those that pass through the gate 103. In the present example, since a 2 is stored in the last order of register 3, only 2 pulses will reach the input of the counter 146 (FIG. 2c). These 2 pulses control the #5 tap of the trigger 148 to drop.

When the multivibrator 73 is turned on, the single-shot 162 is fired, the trailing edge of the resulting pulse being arranged to fire the single-shot 161 and causing the #6 tap of each of the gates 155 through 159 to drop. The delay of the single-shot 162 provides sufficient time for all of the pulses taken from the line 145 to be entered into the counter 146 before read-out is initiated, since it will be recalled that as soon as the #6 taps of the gates 155 through 159 drop read-out is accomplished. Since the #3 tap of the gate 156 is low due to the storage of a 2 in the trigger 148, the #7 tap of the gate 156 rises sharply when the #7 tap of the single-shot 161 drops.

The output lines 165 through 169 from the gates 155 through 159, respectively, are connected through the n/o contacts j through f, respectively, of the relay 32 (FIG. 2e) (it being assumed that the relay 32 is energized at this time) to the common side of each of the d, c, b, a and e contacts of the various relays 121 through 130. Since the relay 130 is energized due to the armature of the stepping switch being in the zero position and since the potential of the line 166 rises sharply to 150 volts when the single-shot 161 (FIG. 2c) fires, the coherer 173 (FIG. 2b) of register 4 is fired, the pulse taken from the line 166 being of sufficient amplitude to fire the coherer.

When the relay 34 (FIG. 2a) drops out, as explained above, the step coil 18 is deenergized and the armature 20 (FIG. 2d) is advanced to the next position. At this time the relays 59, 129 and 139 (FIGS. 2d, 2b and 2e, respectively) are energized and the 2 stored in the coherer 171 of register 3 is entered in a similar manner to that above described into the coherer 174 (FIG. 2b) of the register 4. The armature 20 (FIG. 2d) is similarly advanced to the 9 contact position, at which time the latch winding 24L of the relay 24 is energized, thereby unlatching itse contacts to prevent further energization of the step coil, the relay 21, and the relays 41, 42 and 43. Actuation of the clear key energizes the solenoids 45 and 47, the c contacts of the relay 26 being transferred at this time, thereby clearing registers 3 and 5.

The number 99 is next entered as described above, and the digits thereof are stored in coherers 175, 176, and 177, 178 (FIG. 2d) in binary coded form, the coherers 175 and 177 being arranged to store 1's and the coherers 176 and 178 being arranged to store 8's. Actuation of the add key again controls the contacts of the relay 24 (FIG. 2a) to be latched in their transferred condition and thereby controls the energization of the relays 41, 42 and 43. Also, at this time the relays 26 and 27 both drop out, thereby deenergizing the relay 32. The stepping switch 19 is arranged to scan the registers 3 and 4, the lowest order first, and thereby successively opens various of the gates 101 through 109 (FIG. 2f) corresponding to data stored in the registers 3 and 4. Thus, when the armature 20 is in its home position, the coherer 173 of the register 4 (FIG. 2b), which coherer was fired previously, shorts the #3 tap of the gate 107 to ground since the relay 130 is energized and the relay 32 is deenergized at this time. Similarly, since the coherers 175 and 176 (FIG. 2d) of the register 3 have been fired, the #3 tap of each of the gates 101 and 104 (FIG. 2f) is shorted to ground through the contacts of the relay 60 and through the contacts of the relay 41. The multivibrator 73 (FIG. 2c) is turned on shortly after the relay 24 picks up, and the pulses taken from the #5 and #8 taps thereof are entered into the emitters 72 and 71 (FIG. 2f) of the adder. Since the gates 101, 104 and 107 are open, 11 pulses are applied through the line 145 to the input of the counter 146 (FIG. 2c). This is true since the #7 tap of the trigger 74 (FIG. 2f) rises in potential 8 times, the #7 tap of the trigger 77 drops in potential once, and the #7 tap of the trigger 89 drops in potential twice during the period of operation of the multivibrator 73. Referring to FIG. 11, it will be seen that each of the pulses applied to each of the #5 taps of the various gates 101 through 109 occurs at a different time and these pulses therefore appear as separate and distinct pulses on the line 145.

The application of 11 pulses to the input of the counter 146 (FIG. 2c) results in the #5 tap of each of the triggers 147 and 151 being lowered, and when the single-shot multivibrator 161 fires, the lines 165 and 169 coupled to the "and" gates 155 and 159, respectively, rise sharply. Since the lines 165 and 169, as well as the lines 166, 167 and 168, are connected at this time through the n/c contacts f through j (FIG. 2e) of the relay 32 and through the d, c, b, a and e contacts of the relay 140 to the corresponding one of five coherers 181 through 185, respectively, of the register 5, the coherers 182 and 185 are fired.

Advancement of the stepping switch to the next position, i.e., to a position in engagement with the 1 contact thereof, picks up the relays 59, 129 and 139 (FIGS. 2d, 2b and 2e, respectively) thereby opening gates 108 and 105 (FIG. 2f) and entering the 9 stored in the second order of the register 3 into the emitter 72, opening the gate 103 and entering the 2 stored in the second order of the register 4 into the emitter 71, and opening the carry gate 109 to enter the carry stored in the coherer 185 of the register 5 into the emitter 72. Thus, when the multivibrator 73 (FIG. 2c) completes its cycle, 12 pulses are entered into the counter 146 (FIG. 2c) and the #5 taps of the triggers 151 and 148 thereof are rendered low. The single-shot 161 is next excited and coherers 186 and 187 (FIG. 2e) in the second order of the register 5 are fired, as explained earlier. The carry digit stored in the coherer 187 is entered into the coherer 188 when the stepping switch is advanced to position 3, and it will now be understood that the sum of the two numbers is stored in the register 5.

To provide a visual indication of numbers stored in the registers 3, 4 and 5, a neon bulb 191 is connected between the normally nongrounded side of each coherer and −75 volts, and when a coherer has been fired the bulb 191 corresponding thereto is ignited. A means of read-out of a sum determined by the machine of the invention, other than the visual indication provided by the bulbs 191, has not been disclosed herein, although it is obvious that many forms of read-out devices may be readily adapted for use herewith. It should be clear that any quantity of numbers whose sum does not exceed the capacity of the machine may be added and that the sum of successive numbers will be stored alternately in the registers 4 and 5.

By utilizing the technique of successive addition, it is obvious that the adder of the invention is readily adapted to multiplication. Referring to FIG. 10, such an arrangement is illustrated. Two emitters 201 and 202 which are similar to the forementioned emitters 71 and 72 (FIG. 2f) are each driven by a separate, gated multivibrator, the emitter 201 (FIG. 10) being associated with a multivibrator 203 and the emitter 202 being associated with a multivibrator 204. The multivibrators 203 and 204 are under the control of two triggers 205 and 206, respectively. Each of the emitters 201 and 202 comprises four triggers 208 through 211 and 212 through 215, respectively, of a type described earlier herein and disclosed in detail in FIG. 8.

The #7 tap of each of these triggers is coupled to the #5 tap of the corresponding gates 216 to 223 inclusive, each of which is identical to the gates 101 through 109 (FIG. 2f) described earlier, and it will be understood that the multiplicand is entered into the emitter 202 (FIG. 10) by grounding the #3 taps of the gates 220 through 223 according to the binary coded value thereof. Similarly, the multiplier is entered into the emitter 201 by selectively grounding the #3 taps of the gates 216 to 219 inclusive.

The outputs, i.e., the #7 taps, of the gates 216 through 219 are common and are connected by means of a line 225 to the #3 tap of the trigger 206, the #6 tap of the trigger 206 being connected to the #8 tap of the trigger 215. The #6 tap of the trigger 205 is connected to the #8 tap of the trigger 211, the #3 tap of the trigger 205 being used to control the operation of the multiplier. The #7 taps of the gates 220 to 223 inclusive are also common and are connected by a line 226 to a pulse counter 227 which may be of any convenient design and which is arranged to count the pulses entered therein via the line 226 to thereby determine the product of the multiplicand and multiplier.

The #7 taps of the triggers 205 and 206 are normally low, thereby preventing the operation of the multivibrators 203 and 204, respectively; however, when the #3 taps of these triggers are driven negative the #7 taps rise in potential and the corresponding multivibrator generates 16 pulses, at which time it is turned off by the negative-going edge of the pulse taken from the #8 tap of the corresponding trigger 211 or 215. The frequency of the multivibrator 203 is so arranged that it is less than one-sixteenth the frequency of the multivibrator 204, and each pulse passing through one or more of the gates 216 to 219 inclusive, therefore, operates the trigger 206 and controls the multivibrator 204 to generate 16 pulses.

When the multiplier and multiplicand have been entered in the emitters 201 and 202, respectively, by grounding the #3 taps of the proper gates 216 through 223 and the #3 tap of the trigger 205 is driven sufficiently negative to reverse its condition of stability and to thereby turn on the multivibrator 203, a number of pulses equal to the multiplier pass through the gates 216 to 219 inclusive and through the line 225 to the #3 tap of the trigger 206. Since the multivibrator 204 is controlled to complete one cycle of operation by each such pulse and since during each cycle pulses equal in number to the multiplicand pass through the line 226 to the pulse counter 227, it will be understood that at the end of the cycle of operation of the multivibrator 203 the counter contains the product of the multiplier and multiplicand.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An adder comprising an emitter having a plurality of serially arranged stages, means for supplying a predetermined number of pulses for operating one of said stages, said stage being operated by alternate pulses and successive stages being operable in response to alternate operations of the preceding stage, gating means associated with each said stage, each stage being adapted to enter a signal into the corresponding gate each time said stage is operated, the output of each said gate being connected in common, said emitter being arranged in such a way that signals entered in said gates are separately interspersed in time, and means for selectively opening said gates, whereby the number of said signals at said common output is determined by said opening means.

2. An adder comprising an emitter having a first stage and a plurality of successive stages operative in response to alternate operations of the preceding stage, each said stage being adapted to generate a signal when operated, an output circuit, circuits for gating signals from each of said stages to said output circuit, means for operating said first stage a predetermined number of times, and means for selectively operating said gating circuits according to control voltages representative of a number for gating a quantity of said signals to said output circuit corresponding to said number.

3. An adder comprising first and second emitters, each of which has a first stage and a plurality of successive stages operated in response to alternate operations of the preceding stage, each stage of each said emitter being arranged to emit a signal when operated, an output circuit, a circuit associated with each stage of each of said emitters for gating signals emitted thereby to said output circuit according to control voltages representative of two numbers to be added, and means for operating the first stage of each of said first and second emitters a predetermined number of times, whereby a number of signals corresponding to the sum of said two numbers is entered into said output circuit.

4. An adder comprising first and second emitters, each of which has a first stage and a plurality of successive stages operated in response to alternate operations of the preceding stage, each stage of each said emitters being arranged to emit a signal when operated, an output circuit, a circuit associated with each stage of each of said emitters for gating signals emitted thereby to said output circuit according to control voltages representative of two numbers to be added, means for connecting a first pulse train containing a predetermined number of pulses to said first stage of said first emitter, alternate pulses of said first pulse train being adapted to operate said first stage of said first emitter, means for connecting a second pulse train containing a predetermined number of pulses to said first stage of said second emitter, alternate pulses of said second pulse train being adapted to operate said first stage of said second emitter, said second pulse train being out of phase with said first pulse train, whereby a number of separate and distinct signals corresponding to the sum of said two numbers is entered into said output circuit.

5. An adder comprising a first emitter having a first stage and a plurality of succeeding stages each of which is operative in response to alternate operations of the preceding stage and is adapted when operated to emit a signal, means for operating said first stage a predetermined number of times at spaced intervals, a second emitter having a first stage and a plurality of succeeding stages each of which is operative in response to alternate operations of the preceding stage and is adapted when operated to emit a signal, means for operating said first stage of said second emitter a predetermined number of times at intervals dispersed intermediately of said spaced intervals for controlling signals emitted by the various stages of said second emitter to be interpersed in time with the signals emitted by the various stages of said first emitter, an output circuit, a gating circuit associated with each stage of said first emitter controlled by voltages representative of a first number for connecting a number of said signals corresponding to said first number to said output circuit, and a gating circuit associated with each stage of said second emitter controlled by voltages representative of a second number for connecting a number of said signals corresponding to said second number to said output circuit, whereby a number of separate and distinct signals corresponding to the sum of said first and second numbers is entered in said output circuit.

6. An adder comprising first and second binary counters each of which includes a first stage and three successive stages operated in response to alternate operations of the preceding stage, each stage of each said counter being arranged to generate a signal when operated, an output circuit common to both said counters, means associated with each stage of each said counter for gating signals generated thereby to said output circuit, the gating circuits associated with said first counter being operated according to control voltages representative of the binary coded value of an addend and the gating circuits associated with said second counter being operated according to control voltages representative of the binary coded value of an augend, means including a first pulse train for operating the first stage of said first counter, means including a second pulse train for operating the first stage of said second counter, said first pulse train being out of phase with said second pulse train such that signals generated by the several stages of said counters are serially interspersed in time to occur independently, and counting means controlled by the pulses gated to said output circuit for determining the sum of said augend and said addend.

7. An adder comprising first and second binary counters each of which includes a first stage and three successive stages operated in response to alternate operations of the preceding stage, each stage of each said counter being arranged to generate a signal on alternate operations, an output circuit common to both of said counters, a gating circuit associated with each stage of each said counter for gating signals generated thereby to said output circuit, means for operating the first stage of each of said counters $2^4$ times for controlling said first stages to generate $2^3$ signals each, for controlling said second stages to generate $2^2$ power signals each, for controlling said third stages to generate $2^1$ power signals each and for controlling said fourth stages to generate $2^0$ power signals each, means under control of voltages representative of the binary coded form of a decimal addend for selectively operating the gating circuits associated with said first counter, and means under control of voltages representative of the binary coded form of a decimal augend for selectively operating the gating circuits associated with said second counter, whereby a plurality of signals corresponding in number to the sum of said addend and augend are entered into said output circuit.

References Cited in the file of this patent
UNITED STATES PATENTS

| | | |
|---|---|---|
| 2,401,621 | Desch et al | June 4, 1946 |
| 2,528,394 | Sharpless et al. | Oct. 31, 1950 |
| 2,533,821 | Langer | Dec. 12, 1950 |
| 2,567,944 | Krause et al. | Sept. 18, 1951 |
| 2,568,644 | Larsen et al. | Sept. 18, 1951 |
| 2,636,672 | Hamilton | Apr. 28, 1953 |
| 2,639,859 | Serrell | May 26, 1953 |
| 2,719,670 | Jacobs | Oct. 4, 1955 |
| 2,761,621 | Wright et al. | Sept. 4, 1956 |

FOREIGN PATENTS

| | | |
|---|---|---|
| 705,479 | Great Britain | Mar. 17, 1954 |
| 709,410 | Great Britain | May 26, 1954 |
| 712,034 | Great Britain | July 14, 1954 |
| 724,137 | Great Britain | Feb. 16, 1955 |